March 9, 1943.  H. O. PETERSON  2,313,666
LOGARITHMIC INSTRUMENT CIRCUIT
Filed Jan. 26, 1940  3 Sheets-Sheet 1
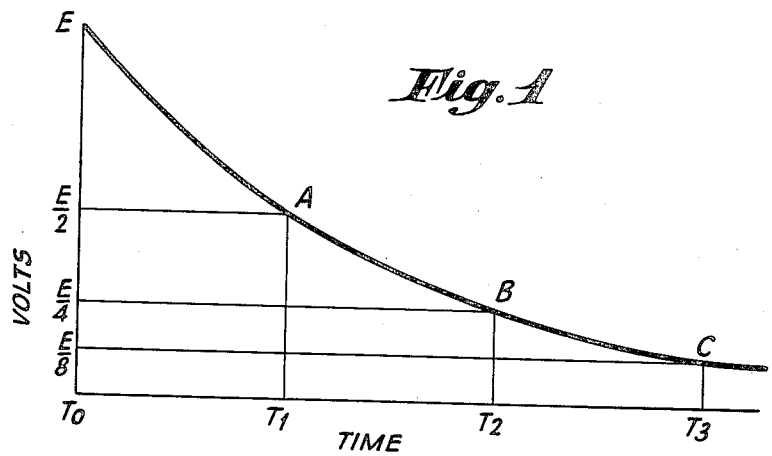
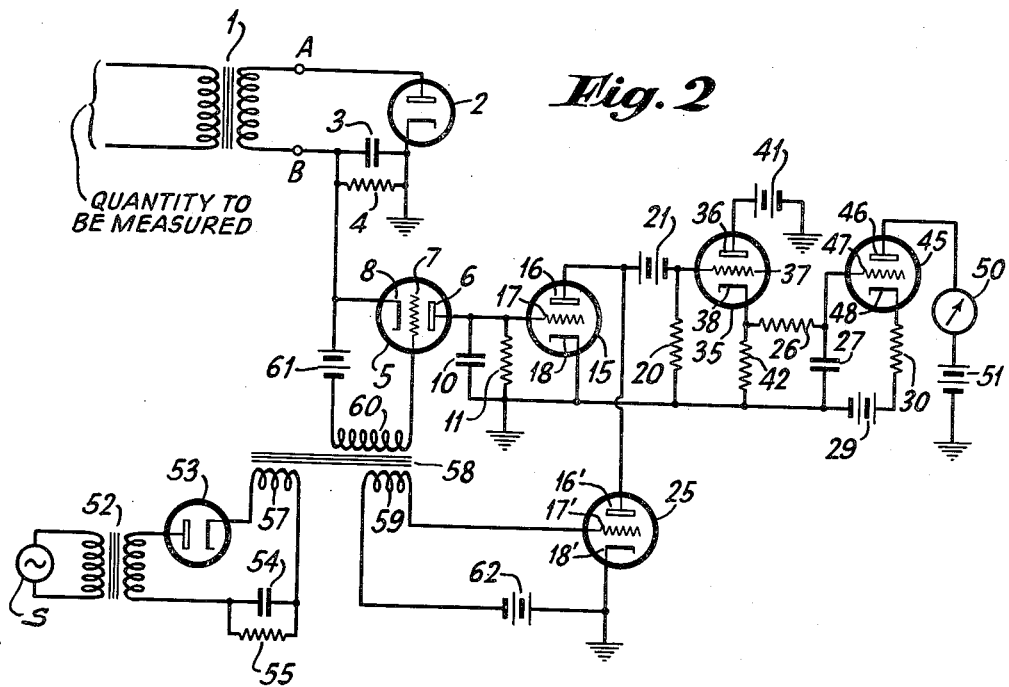
INVENTOR.
HAROLD O. PETERSON
BY
ATTORNEY.

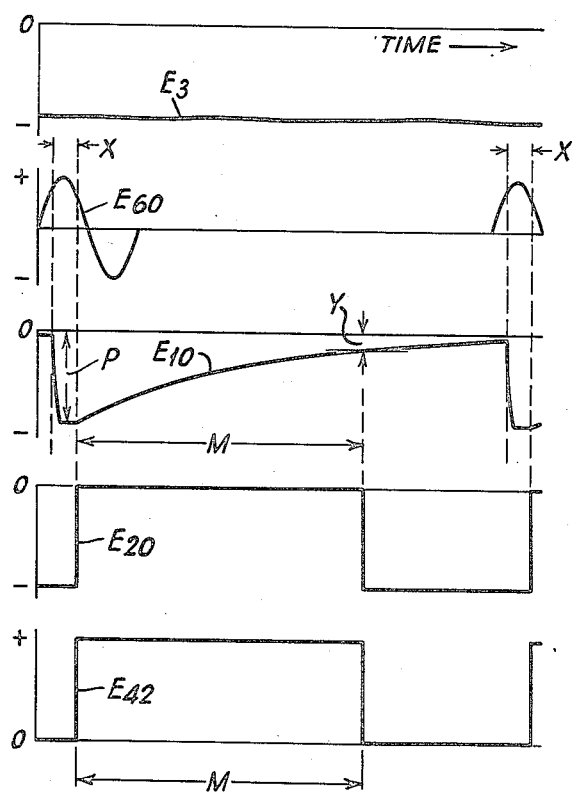

Patented Mar. 9, 1943

2,313,666

UNITED STATES PATENT OFFICE 2,313,666

LOGARITHMIC INSTRUMENT CIRCUIT

Harold O. Peterson, Riverhead, N. Y., assignor to Radio Corporation of America, a corporation of Delaware Application January 26, 1940, Serial No. 315,684

8 Claims. (Cl. 171—95)

The present invention relates to measuring instruments and, more particularly, to instruments in which the indication given is proportional to the logarithm of the quantity measured. In many types of measurement it is desirable to have an instrument in which the deflection is proportional to the logarithm of the magnitude of the quantity being measured. For example, in communications work much of the data collected are in terms of decibels with respect to some arbitrarily assumed zero level. Various devices have been contrived for obtaining instruments in which the deflection is proportional to the logarithm of the magnitude being measured but many of these devices have been relatively unstable or difficult to produce with the desired overall characteristics.

An object, therefore, of the present invention is the provision of a measuring instrument in which indication is directly proportional to the logarithm of the quantity being measured.

A further object is the provision of a logarithmic measuring instrument which inherently responds proportionally to the logarithm of the quantity measured and does not depend purely upon a logarithmic calibration of a linear instrument.

Still another object of the invention is the provision of a logarithmic instrument which is stable in its characteristics.

Still a further object is the provision of a logarithmic instrument which is convenient to manufacture with the desired overall characteristics.

In a measuring instrument constructed according to the present invention the difficulties heretofore mentioned are overcome because the operation of the device depends upon a fundamental law of nature which is easily controlled in practice. The invention depends for its operation upon steps of storing in a brief interval of time a charge proportional to the quantity being measured, allowing the charge to be dissipated through a constant resistance until it reaches a predetermined value, storing a second charge the average value of which is proportional to the time required for the first mentioned charge to drop to said predetermined value, controlling a current in accordance with the average value of said second stored charge and indicating the amplitude of said current. This indication will be logarithmically proportional to the original quantity measured.

Figure 5:
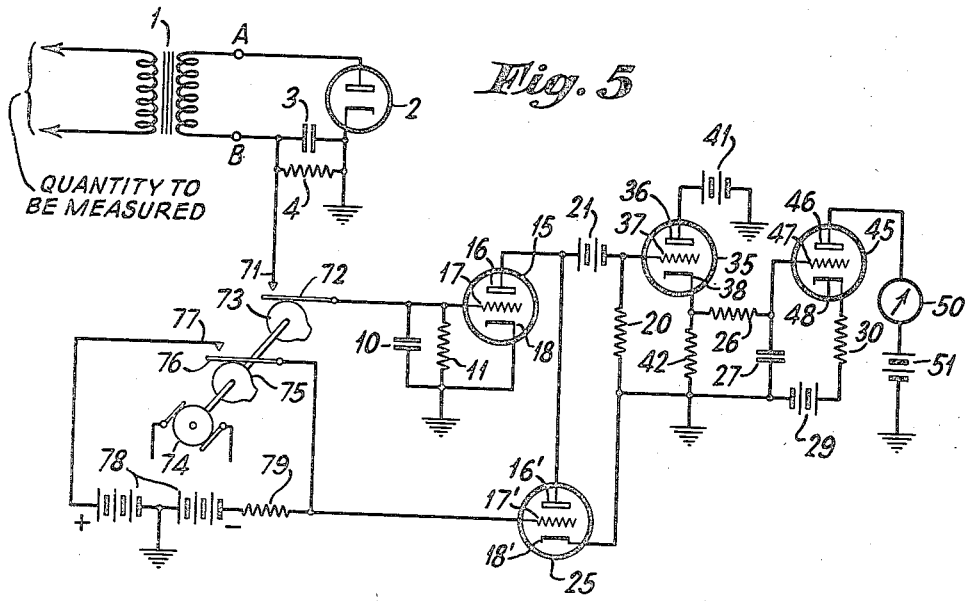
Figure 6:
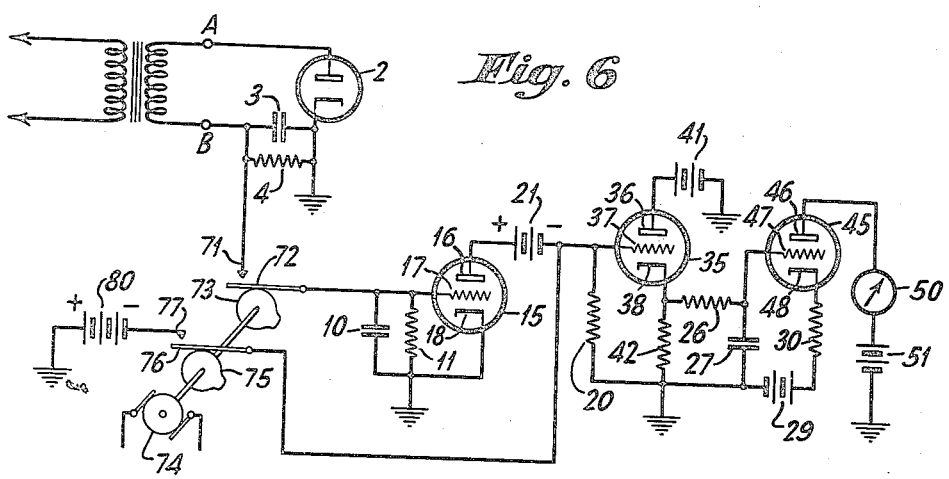

Further objects and features of the present invention will appear from the following detailed description which is accompanied by drawings in which Figure 1 is a curve illustrative of the basic principle of the invention; Figure 2 is a circuit diagram of one embodiment of the invention; Figures 3 and 4 are curves showing circuit conditions at various points in the embodiment of the invention shown in Figure 2; Figure 5 is a modification of the form of the invention shown in Figure 2 and Figure 6 is still a further modification.

The principle involved in the invention is demonstrated by the curve shown in Figure 1. This figure represents the discharge curve of a condenser discharging through a constant resistance. If we start with a voltage E across a condenser at a time $T_0$ the voltage at a later time $T_1$ may have dropped to a value E/2, as shown at point A. After a lapse of time equal to the first time, that is, at a time $T_2$ the voltage has again dropped to half value, or E/4 as shown at point B, and after another equal interval of time, at $T_3$, the voltage has again dropped to half value or E/8, as shown at point C. If we arbitrarily assign to the value of the voltage at point C some definite value as, for instance, 1 volt, then the time required for the condenser to discharge to this value from some other value of voltage will be proportional to the logarithm of that other value of voltage. For instance, if we say that the voltage at point C is 1 volt then the voltage at point B is 2 volts, that at point A is 4 volts and that at point E is 8 volts. It will be noted that the discharge time from point E to point C is 3 times that from point B to C. Likewise, the logarithm of 8 is 3 times the logarithm of 2. Consequently, we have in Figure 1 the desired logarithmic type of curve which is utilized in the measuring circuit which will be now described.

Referring to Figure 2, consider a voltage which it is desired to indicate on the galvanometer 50 as applied across the terminals A, B. The voltage may be applied to terminals A, B from the desired source by any desired means such as transformer 1. If the voltage is an audio frequency voltage it will be an iron core transformer as shown. In the case of a radio frequency voltage a radio frequency transformer will be utilized and in the case of a direct current a direct connection will be used. The voltage across A, B, if alternating in character, is rectified by rectifier 2 and stored in condenser 3. This direct voltage is stored for a length of time which is proportional to the product of the capacity of condenser 3 and the resistance of leak resistor 4. This product is known as the time constant of the circuit and, for convenience, such circuit will hereinafter be called a time constant circuit. Tube 5 is operated as a valve for connecting a second time constant circuit comprising condenser 10 and resistor 11 across condenser 4 for short periods of time spaced by regular intervals. Tube 5 is shown as a conventional triode having its cathode 8 connected to condenser 3 and plate 6 connected to condenser 10. The circuit connected to grid 7 will be more fully described hereafter. Tubes 15 and 25 are likewise shown as conventional triodes having plates 16, 16', grids 17, 17' and cathodes 18, 18'. The tubes 15 and 25 are so chosen that the plate current may be reduced to zero by making the grids 17 and 17' a few volts negative with respect to the cathodes 18 and 18'. When the plate currents in tubes 15 and 25 are zero the voltage drop across resistor 20 is zero and, consequently, grid 37 of vacuum tube 35 connected to one end has a zero bias with respect to cathode 38 connected to the other end of resistor 20. The vacuum tube 35, therefore, draws plate current from source 41. The current flow through resistance 42 impresses a positive potential on the upper plate of condenser 27 which is connected to grid 47 of tube 45. The amount of plate current drawn by tube 45 through galvanometer 50 from plate potential source 51 is thus controlled by the charge on condenser 27.

Now it is desirable to cause tubes 5 to be conductive a relatively small portion of the total time involved in one sequence of operation and for that reason the controlling voltage which is to be applied to grid 7 preferably has a sharp peaked wave shape. This effect may be produced in a number of different ways one of which is illustrated in Figure 2. In the particular structure shown a sinusoidal voltage is impressed upon the primary of transformer 52 from alternating current source S. The frequency of this voltage may be established at any convenient value which will give the desired results with the other chosen constants of the circuit. However, it is desirable to operate with a constant frequency since the calibration of the instrument circuit overall is somewhat dependent thereon. This voltage is passed through a rectifier 53 which charges condenser 54 on each positive half cycle. During alternate half cycles the condenser 54 discharges through resistance 55. The charging current for the condenser is in the form of short pulses. These pulses passing through the primary winding 57 of transformer 58 induce voltages in the secondaries 59, 60 having a wave shape similar to those shown in Figure 3. Winding 60 impresses the voltage induced therein on grid 7 of vacuum tube 5 and similarly transformer winding 59 is connected to apply the voltage impulses induced therein to grid 17' and cathode 18' of tube 25. The bias voltages for grids 7 and 17' from sources 61 and 62 are so adjusted that tubes 5 and 25 become conductive only for short intervals of time, such as during the time interval between C and D in Figure 3. Referring to Figure 2, tube 25 is arranged to draw current through resistor 20 during the time when condenser 10 is being charged through valve 5. The length of time interval M (Figure 4) is thereby limited to the discharge time of condenser 10 only. It would otherwise include the charging time X.

The complete operation of the device will be clearly understood by reference to the curves of Figure 4, as well as to the circuit of Figure 2. In Figure 4 $E_3$ represents the voltage appearing across condenser 3 of Figure 2. It may be considered as having a fairly constant average value over the time interval required for one operating cycle of the circuit. $E_{60}$ represents the voltage appearing across secondary 60 and secondary 59 of transformer 58. As explained with reference to Figure 3, the bias sources 61 and 62 are so adjusted that tubes 5 and 25 are conductive only during the interval X. During this time interval condenser 10 charges to a value indicated as P in the diagram for $E_{10}$. At the end of conductive period X condenser 10 ceases to receive a further charge and discharges along the line $E_{10}$. This line is a logarithmic curve as heretofore pointed out. Eventually, the voltage $E_{10}$ will reach a value Y at which value tube 15 becomes conductive. The voltage across resistance 20, which is in the plate circuit of tube 15, therefore varies in the manner shown in the curve $E_{20}$. It will be noted that current flows through resistance 20 only during the time that condenser 10 is being charged and during the portion of the operating cycle after the voltage $E_{10}$ has reached the value represented as Y.

Whenever no current flows in resistance 20 tube 35 draws a fixed amount of current through resistance 42 producing a voltage thereacross, represented in Figure 4 as $E_{42}$. It will be seen that this constant value current flows through resistance 42 only during the period M in which condenser 10 is discharging from peak value P to the threshold value Y.

Now the resistance 26 and condenser 27 tend to establish a relatively steady average state of voltage on the grid 47 of tube 45. The average voltage established across condenser 27 is proportional to the length of time interval M which in turn is proportional to the logarithm of the peak voltage P. The peak voltage P is directly proportional to the voltage impressed in terminals A, B. Consequently, the galvanometer 50 reads up scale in logarithmic proportion to the voltage impressed across terminals A, B.

While throughout Figure 2 I have shown triode vacuum tubes, if desired, these tubes may be of the multi-element type. Also, the plate and bias voltages which are shown as derived from separate potential sources may be derived from a single voltage divider circuit if desired.

The modification shown in Figure 5 is similar to that shown in Figure 2 except that instead of using a vacuum tube as a timing valve, mechanical contacts are utilized. In Figure 5 the time constant circuit 10, 11 is periodically connected to sample the voltage across resistor 4 by means of contacts 71, 72 which are closed by cam 73, driven by motor 74. Motor 74 also drives cam 75 which closes contacts 76, 77 applying potential from the positive side of source 78 across resistor 79 during the time which contacts 71, 72 are closed. The vacuum tube 25 is therefore caused to draw plate current through resistor 20 and thus bias tube 35 to cut off. Aside from these mechanical details, the operation of the circuit of Figure 5 is exactly the same as that of Figure 2. If desired, the circuit shown in Figure 5 may be further modified as shown in Figure 6. In this figure the vacuum tube of Figure 5 has been dispensed with and potential from battery 80 is applied by means of contacts 76, 77 directly to resistance 20 to bias tube 35 to cut off.

While I have particularly shown and described an embodiment of the present invention, it is to be clearly understood that my invention is not limited thereto but that modifications may be made within the scope of this invention.

I claim:

1. In a logarithmic instrument circuit the method of operation which comprises the steps of storing a charge proportional to the amplitude of the quantity to be measured, dissipating said charge at a logarithmically varying rate to a predetermined value, storing a second charge the value of which is proportional to the time required for said first charge to be dissipated to said predetermined value, controlling a current in accordance with the value of said second stored charge and indicating the value of said current.

2. In a logarithmic instrument circuit the method of operation which comprises the steps of storing a charge proportional to the amplitude of the quantity to be measured dissipating said charge at a logarithmically varying rate to a predetermined value, controlling a current in accordance with the time required for said charge to reach said value and indicating the value of said current.

3. In a logarithmic instrument circuit the method of operation which comprises the steps of storing a charge proportional to the amplitude of the quantity to be measured, dissipating said charge at a logarithmically varying rate through a constant resistance to a predetermined value, storing a second charge the value of which is proportional to the time required for said first charge to be dissipated to said predetermined value, controlling a current in accordance with the average value of said second stored charge and indicating the value of said current.

4. A logarithmic instrument circuit comprising a condenser for storing a charge proportional to the amplitude of the quantity to be measured, a fixed resistor across said condenser for dissipating said charge to a predetermined value, means for storing a second charge of the value of which is proportional to the time required for said first charge to reach said predetermined value, means for controlling a current in accordance with the average value of said second charge and means for measuring said current.

5. A logarithmic instrument circuit comprising a condenser for storing a charge proportional to the amplitude of the quantity to be measured, a fixed resistor across said condenser for dissipating said charge to a predetermined value, means for controlling a current in accordance with the time required for said charge to reach said value and means for measuring said current.

6. In a logarithmic instrument circuit a pair of input terminals adapted to be supplied with electrical energy to be measured, a first condenser, means for storing on said condenser a charge proportional to the amplitude of said energy, a second condenser, means for momentarily connecting said condensers together whereby a charge is stored on said second condenser, a first resistance across said second condenser for dissipating said charge, a vacuum tube having a grid circuit and an anode circuit connected thereto, said second condenser being included in the grid circuit of said vacuum tube and being so arranged that said tube is biased to cut off as long as the charge on said second condenser exceeds a predetermined amount, a second vacuum tube having a second resistance in its anode circuit and arranged to draw a constant anode circuit only during the length of time said first vacuum tube is biased to cut off, a third condenser and a third resistance connected across said second resistance, a third vacuum tube having said third resistance included in its control circuit whereby its anode current varies in accordance with the charge on said third condenser and means for measuring said anode current.

7. In a logarithmic instrument circuit a pair of input terminals adapted to be supplied with electrical energy to be measured, a first condenser, means for storing on said condenser a charge proportional to the amplitude of said energy, a second condenser, a first vacuum tube for momentarily connecting said condensers together whereby a charge is stored on said second condenser, a first resistance across said second condenser for dissipating said charge, a second vacuum tube having a grid circuit and an anode circuit connected thereto, said second condenser being included in the grid circuit of said vacuum tube and being so arranged that said tube is biased to cut off as long as the charge on said second condenser exceeds a predetermined amount, a third vacuum tube having a second resistance in its anode circuit and arranged to draw a constant anode circuit only during the length of time said second vacuum tube is biased to cut off, a third condenser and a third resistance connected across said second resistance, a fourth vacuum tube having said third resistance included in its control circuit whereby its anode current varies in accordance with the charge on said third condenser and means for measuring said anode current.

8. In a logarithmic instrument circuit a pair of input terminals adapted to be supplied with electrical energy to be measured, a first condenser, means for storing on said condenser a charge proportional to the amplitude of said energy, a second condenser, means for momentarily connecting said condensers together whereby a charge is stored on said second condenser, a first resistance across said second condenser for dissipating said charge, a first vacuum tube having a grid circuit including said condenser and so arranged that said tube is biased to cut off as long as the charge on said condenser exceeds a predetermined amount, a second vacuum tube, said first and second tubes having a common anode circuit resistor, means for causing said second tube to draw anode current when said first and second condensers are connected together, a third vacuum tube having an anode circuit and a control grid so connected to said common anode resistance that said third tube passes current only while said first and second tubes are biased to cut off, a third condenser adapted to be charged by potentials developed in said third vacuum tube anode circuit, a fourth vacuum tube, means for controlling anode current in said fourth tube in accordance with the charge on said third condenser and means for measuring said anode current.

HAROLD O. PETERSON.